(12) United States Patent
Patten

(10) Patent No.: US 8,961,652 B2
(45) Date of Patent: Feb. 24, 2015

(54) METHOD FOR THE REMOVAL AND CONDENSATION OF VAPORS

(75) Inventor: James W. Patten, Sandy, UT (US)

(73) Assignee: Red Leaf Resources, Inc., South Jordan, UT (US)

( * ) Notice: Subject to any disclaimer, the term of this patent is extended or adjusted under 35 U.S.C. 154(b) by 1069 days.

(21) Appl. No.: 12/970,005

(22) Filed: Dec. 16, 2010

(65) Prior Publication Data

US 2011/0138649 A1 Jun. 16, 2011

Related U.S. Application Data

(60) Provisional application No. 61/286,900, filed on Dec. 16, 2009.

(51) Int. Cl.
*F26B 23/00* (2006.01)
*C10G 31/06* (2006.01)
*C10G 1/00* (2006.01)

(52) U.S. Cl.
CPC ............... *C10G 31/06* (2013.01); *C10G 1/002* (2013.01); *C10G 1/008* (2013.01); *C10G 2300/1011* (2013.01)
USPC ................... 95/50; 34/468; 34/469; 210/175; 210/180; 210/640; 203/10; 95/52

(58) Field of Classification Search
None
See application file for complete search history.

(56) References Cited

U.S. PATENT DOCUMENTS

| 1,919,636 A | 7/1933 | Karrick |
| 2,481,051 A | 9/1949 | Uren |
| 2,789,695 A | 4/1957 | Winkler |

(Continued)

FOREIGN PATENT DOCUMENTS

| CA | 2235085 | * 10/1999 | .............. E21B 43/24 |
| CN | 1956768 | 5/2007 | |

(Continued)

OTHER PUBLICATIONS

Polasky, M.E. et al. (1988). Fuel Science and Technology International, 6(1), 83-94.*

(Continued)

*Primary Examiner* — Brian McCaig
(74) *Attorney, Agent, or Firm* — Thorpe North & Western LLP

(57) ABSTRACT

A method for removal and condensation of vapors from within an enclosed space (120) is disclosed. An enclosed space (120) containing material (110) is surrounded by an insulative permeable layer (130) having a lowering temperature gradient (230) between the inner surface (220) and the outer surfaces (240). The insulative layer (130) may also be covered by an impermeable layer (140). Heating the material (110) in the enclosed space (120) causes the formation of vapors at a positive pressure within the enclosed space (120). Vapors pass through the inner surface (220) of the insulative permeable layer (130) and contact the permeable materials and are condensed by the lowering temperature within the insulative layer (130). The condensate liquid passes downwardly through the insulative layer (130) for collection. The positive pressure within the heated enclosed space (120) and the condensation and lowering of pressure and temperature within the insulative layer (130) serves to draw additional vapors from within the enclosed space (120) into the insulative layer (130) for condensation and collection.

12 Claims, 1 Drawing Sheet

(56) References Cited

U.S. PATENT DOCUMENTS

| | | | |
|---|---|---|---|
| 3,483,115 A | 12/1969 | Haddad et al. | |
| 3,617,471 A | 11/1971 | Schlinger et al. | |
| 3,652,447 A | 3/1972 | Yant et al. | |
| 3,661,423 A | 5/1972 | Garrett | |
| 3,684,816 A * | 8/1972 | Reighter | 174/15.6 |
| 3,910,834 A | 10/1975 | Anderson | |
| 3,919,390 A | 11/1975 | Moore | |
| 3,954,140 A | 5/1976 | Hendrick | |
| 4,017,119 A | 4/1977 | Lewis | |
| 4,029,571 A | 6/1977 | Curtin | |
| 4,043,595 A | 8/1977 | French | |
| 4,089,375 A * | 5/1978 | Cha | 166/261 |
| 4,096,912 A | 6/1978 | Lewis et al. | |
| 4,106,814 A | 8/1978 | French | |
| 4,133,580 A | 1/1979 | French | |
| 4,151,068 A | 4/1979 | McCollum et al. | |
| 4,155,967 A | 5/1979 | South et al. | |
| 4,158,622 A | 6/1979 | Schwarzenbek | |
| 4,171,146 A | 10/1979 | Hard | |
| 4,174,751 A * | 11/1979 | Compton | 166/256 |
| 4,199,327 A | 4/1980 | Hempill et al. | |
| 4,219,237 A | 8/1980 | Sisemore | |
| 4,221,648 A | 9/1980 | Martin | |
| 4,230,557 A | 10/1980 | Bertelsen et al. | |
| 4,234,230 A | 11/1980 | Weichman | |
| 4,241,952 A | 12/1980 | Ginsburgh | |
| 4,266,612 A | 5/1981 | French | |
| 4,266,826 A | 5/1981 | French | |
| 4,294,563 A | 10/1981 | Kilburn | |
| 4,303,533 A | 12/1981 | Fremont | |
| 4,353,418 A | 10/1982 | Hoekstra et al. | |
| 4,376,107 A | 3/1983 | Morgenthaler | |
| 4,404,085 A | 9/1983 | York et al. | |
| 4,415,365 A | 11/1983 | Spars et al. | |
| 4,423,907 A | 1/1984 | Ridley | |
| 4,424,021 A | 1/1984 | Merrill, Jr. | |
| 4,430,195 A | 2/1984 | Oltrogge | |
| 4,440,446 A | 4/1984 | Hutchins | |
| 4,449,586 A | 5/1984 | Urban et al. | |
| 4,452,689 A | 6/1984 | Russum | |
| 4,454,915 A | 6/1984 | York et al. | |
| 4,469,805 A | 9/1984 | Kofke | |
| 4,502,920 A | 3/1985 | Edwards | |
| 4,753,293 A * | 6/1988 | Bohn | 166/267 |
| 4,851,134 A | 7/1989 | Bennoit et al. | |
| 4,879,019 A | 11/1989 | Ward | |
| 4,984,594 A | 1/1991 | Vinegar et al. | |
| 5,024,487 A | 6/1991 | Woestemeyer et al. | |
| 5,041,209 A | 8/1991 | Cha et al. | |
| 5,076,727 A | 12/1991 | Johnson et al. | |
| 5,114,497 A | 5/1992 | Johnson et al. | |
| 5,137,539 A | 8/1992 | Bowling | |
| 5,139,535 A | 8/1992 | Strickland et al. | |
| 5,190,405 A | 3/1993 | Vinegar et al. | |
| 5,193,934 A | 3/1993 | Johnson et al. | |
| 5,221,827 A | 6/1993 | Marsden et al. | |
| 5,229,583 A | 7/1993 | Van Egmond et al. | |
| 5,244,310 A | 9/1993 | Johnson | |
| 5,271,693 A | 12/1993 | Johnson et al. | |
| 5,318,116 A | 6/1994 | Vinegar et al. | |
| 5,340,467 A | 8/1994 | Gregoli et al. | |
| 537,262 A | 12/1994 | Staton | |
| 5,372,708 A | 12/1994 | Gewertz | |
| 5,478,443 A | 12/1995 | Cogat | |
| 5,543,041 A | 8/1996 | Okazaki et al. | |
| 5,553,189 A | 9/1996 | Stegemeier et al. | |
| 5,656,239 A | 8/1997 | Stegemeier et al. | |
| 5,660,500 A | 8/1997 | Marsden, Jr. et al. | |
| 5,674,424 A | 10/1997 | Iben et al. | |
| 5,843,214 A | 12/1998 | Janes | |
| 5,868,202 A | 2/1999 | Hsu | |
| 5,948,253 A | 9/1999 | Hearn | |
| 5,997,214 A | 12/1999 | De Rouffignac et al. | |
| 5,997,732 A | 12/1999 | Yenni et al. | |
| 6,051,137 A | 4/2000 | Deskins | |
| 6,102,622 A | 8/2000 | Vinegar et al. | |
| 6,110,359 A | 8/2000 | Davis et al. | |
| 6,419,423 B1 | 7/2002 | Vinegar et al. | |
| 6,485,232 B1 | 11/2002 | Vinegar et al. | |
| 6,543,535 B2 | 4/2003 | Converse et al. | |
| 6,543,539 B1 | 4/2003 | Vinegar et al. | |
| 6,632,047 B2 | 10/2003 | Vinegar et al. | |
| 6,732,796 B2 | 5/2004 | Vinegar et al. | |
| 6,811,683 B2 | 11/2004 | Davis et al. | |
| 6,824,328 B1 | 11/2004 | Vinegar et al. | |
| 6,841,077 B2 | 1/2005 | Gannon et al. | |
| 6,854,929 B2 | 2/2005 | Vinegar et al. | |
| 6,875,356 B2 | 4/2005 | Perriello | |
| 6,881,009 B2 | 4/2005 | Stegemeier et al. | |
| 6,902,138 B2 | 6/2005 | Vantouroux | |
| 6,918,443 B2 | 7/2005 | Wellington et al. | |
| 6,923,257 B2 | 8/2005 | Wellington et al. | |
| 6,929,330 B2 | 8/2005 | Drake et al. | |
| 6,951,247 B2 | 10/2005 | De Rouffignac et al. | |
| 6,962,466 B2 | 11/2005 | Vinegar et al. | |
| 6,991,033 B2 | 1/2006 | Wellington et al. | |
| 7,004,247 B2 | 2/2006 | Cole et al. | |
| 7,004,251 B2 | 2/2006 | Ward et al. | |
| 7,004,678 B2 | 2/2006 | Stegemeier et al. | |
| 7,032,660 B2 | 4/2006 | Vinegar et al. | |
| 7,040,397 B2 | 5/2006 | De Rouffignac et al. | |
| 7,040,399 B2 | 5/2006 | Wellington et al. | |
| 7,048,051 B2 | 5/2006 | McQueen | |
| 7,051,811 B2 | 5/2006 | De Rouffignac et al. | |
| 7,066,254 B2 | 6/2006 | Vinegar et al. | |
| 7,070,758 B2 | 7/2006 | Peterson | |
| 7,073,578 B2 | 7/2006 | Vinegar et al. | |
| 7,077,198 B2 | 7/2006 | Vingar et al. | |
| 7,077,199 B2 | 7/2006 | Vinegar et al. | |
| 7,090,013 B2 | 8/2006 | Wellington | |
| 7,091,460 B2 | 8/2006 | Kinzer | |
| 7,114,566 B2 | 10/2006 | Vinegar et al. | |
| 7,121,342 B2 | 10/2006 | Vinegar et al. | |
| 7,534,926 B2 | 5/2009 | Stegemeier et al. | |
| 7,862,705 B2 | 1/2011 | Dana et al. | |
| 7,862,706 B2 | 1/2011 | Dana et al. | |
| 2004/0211569 A1 | 10/2004 | Vinegar et al. | |
| 2006/0213657 A1 | 9/2006 | Verchenko et al. | |
| 2007/0000662 A1 | 1/2007 | Symington et al. | |
| 2007/0023186 A1 | 2/2007 | Kaminsky et al. | |
| 2008/0077430 A1 | 3/2008 | Singer et al. | |
| 2008/0190813 A1 | 8/2008 | Dana | |
| 2008/0190815 A1 | 8/2008 | Dana | |
| 2008/0190816 A1 | 8/2008 | Dana | |
| 2008/0190818 A1 | 8/2008 | Dana | |
| 2009/0007484 A1 | 1/2009 | Smith | |
| 2009/0250380 A1 | 10/2009 | Dana | |
| 2010/0200465 A1 | 8/2010 | Dana | |
| 2010/0200467 A1 | 8/2010 | Dana | |
| 2011/0138649 A1 | 6/2011 | Patten | |

FOREIGN PATENT DOCUMENTS

| | | |
|---|---|---|
| GB | 339681 A | 12/1930 |
| JP | 2005-306721 | 11/2005 |
| JP | 2009/090168 | 4/2009 |
| KR | 10-0595792 | 7/2006 |
| WO | WO 2008/098177 | 8/2008 |

OTHER PUBLICATIONS

U.S. Appl. No. 12/701,156, filed Feb. 5, 2010; Todd Dana; office action issued Mar. 12, 2012.

Slow Sand Filter: http://en.wikipedia.org/wiki/Slow_sand_filter; Nov. 9, 2009; 4 pages.

Sand Filter: http://en.wikipedia.org/wiki/Sand_filter; Nov. 9, 2009; 6 pages.

Alternative Methods for Fluid Delivery and Recovery; Manual; Sep. 1994; United States Environmental Protection Agency; 87 pages.

Related Case: U.S. Appl. No. 12/960,215, filed Dec. 3, 2010; James Patten.

(56) References Cited

OTHER PUBLICATIONS

Related Case: U.S. Appl. No. 12/984,394, filed Jan. 4, 2011; Todd Dana.
U.S. Appl. No. 12/984,394, filed Jan. 4, 2011; Todd Dana; office action issued Jun. 1, 2011.
U.S. Appl. No. 12/703,560, filed Feb. 10, 2010; Todd Dana; office action issued Apr. 24, 2012.
U.S. Appl. No. 12/701,156, filed Feb. 5, 2010; Todd Dana; notice of allowance dated Jul. 30, 2012.
U.S. Appl. No. 12/703,560, filed Feb. 10, 2010; Todd Dana; notice of allowance dated Sep. 4, 2012.
PCT Application PCT/US2010/060854; filed Dec. 16, 2010; James W. Patten; International Search Report mailed Aug. 26, 2011.
PCT Application PCT/US2010/058948; filed Dec. 3, 2010; James W. Patten; International Search Report mailed Aug. 31, 2011.
U.S. Appl. No. 12/703,560, filed Feb. 10, 2010; Todd Dana; office action issued Nov. 18, 2011.
U.S. Appl. No. 12/984,394, filed Jan. 4, 2011; Todd Dana; notice of allowance issued Oct. 26, 2011.
U.S. Appl. No. 12/960,215, filed Dec. 3, 2010; James W. Patten; office action dated Mar. 28, 2013.
EP application 10842626.3; filing date Oct. 24, 2012; Red Leaf Resources, Inc.; European Search Report dated Nov. 25, 2014.

\* cited by examiner

US 8,961,652 B2

METHOD FOR THE REMOVAL AND CONDENSATION OF VAPORS

RELATED APPLICATION

This application claims priority to U.S. Provisional Application No. 61/286,900, filed Dec. 16, 2009 entitled "Method for the Removal and Condensation of Vapors," which is incorporated herein by reference.

BACKGROUND OF THE INVENTION

Global and domestic demand for fossil fuels continues to rise despite price increases and other economic and geopolitical concerns. As such demand continues to rise, research and investigation into finding additional economically viable sources of fossil fuels correspondingly increases. Historically, many have recognized the vast quantities of energy stored in oil shale, coal and tar sand deposits.

One method and system for the recovery of hydrocarbons from such materials is disclosed and claimed in U.S. application Ser. No. 12/028,569, filed Feb. 8, 2008 which is incorporated herein in its entirety by reference. In that application, a method of recovering hydrocarbons from hydrocarbonaceous materials is disclosed including forming a constructed permeability control infrastructure. This constructed infrastructure defines a substantially encapsulated volume. A mined hydrocarbonaceous material, such as oil shale, can be introduced into the control infrastructure to form a permeable body of hydrocarbonaceous material. The permeable body can be heated sufficient to reform and remove hydrocarbons therefrom leaving a lean shale or other earthen material. During heating the hydrocarbonaceous material can be substantially stationary. Removed hydrocarbons can be collected for further processing, use in the process as supplemental fuel or additives, and/or direct use without further treatment. The lean shale or other material may remain in the infrastructure. The control infrastructure can include fully lined impermeable layers or impermeable side layers with a substantially impermeable floor and cap.

One problem encountered in processing such hydrocabronaceous materials is the collection and recovery of vaporized hydrocarbons from within the enclosed or encapsulated volume. At temperatures required for vaporization and removal of hydrocarbons it is desirable that a collection system be provided that is functional to remove optimal amounts of hydrocarbons from within such enclosed volume. Hydrocarbons that are liquids and/or are condensed within the enclosed volume can be drained from the lower portion by appropriate conduits, pipes, or other collection means. Vapors can also be removed by passage from the interior of the enclosed volume through properly placed conduits, pipes or vents. However, such methods involve circulation and removal of vapors from designated positions within the enclosed volume.

For these and other reasons, the need remains for methods and systems which can provide for the improved recovery and condensation of hydrocarbons vapors released from suitable hydrocarbon-containing materials from within an enclosed volume.

SUMMARY

The removal, condensation and recovery of vapors from within a heated enclosed volume can be accomplished by a heated enclosed space surrounded by an insulative particulate layer of earthen material having a temperature gradient with decreasing temperature from the inner layer surface to the outer layer surface. The insulative layer is permeable to vapors. A material is placed within the enclosed space and heated to produce vapors and optionally liquids. Liquids extracted from the material drain from the lower portion of the enclosed space for collection. Due to the heating of the material and formation of vapors, a positive pressure is developed within the enclosed space and the vapors that are not liquefied pass through the inner surface of the insulative particulate layer and move toward the outer surface. While in the insulative particulate layer, the vapors contact the particulate earthen material and are also subjected to lowering of the temperature across the temperature gradient. As a result the vapors condense and the condensable liquids pass downwardly through the insulative particulate layer and are collected. An optional impermeable outer covering, such as bentonite amended soil, may encapsulate or enclose the insulative particulate layer.

Additional features and advantages of the invention will be apparent from the following detailed description, which illustrates, by way of example, features of the invention.

Figure 1:
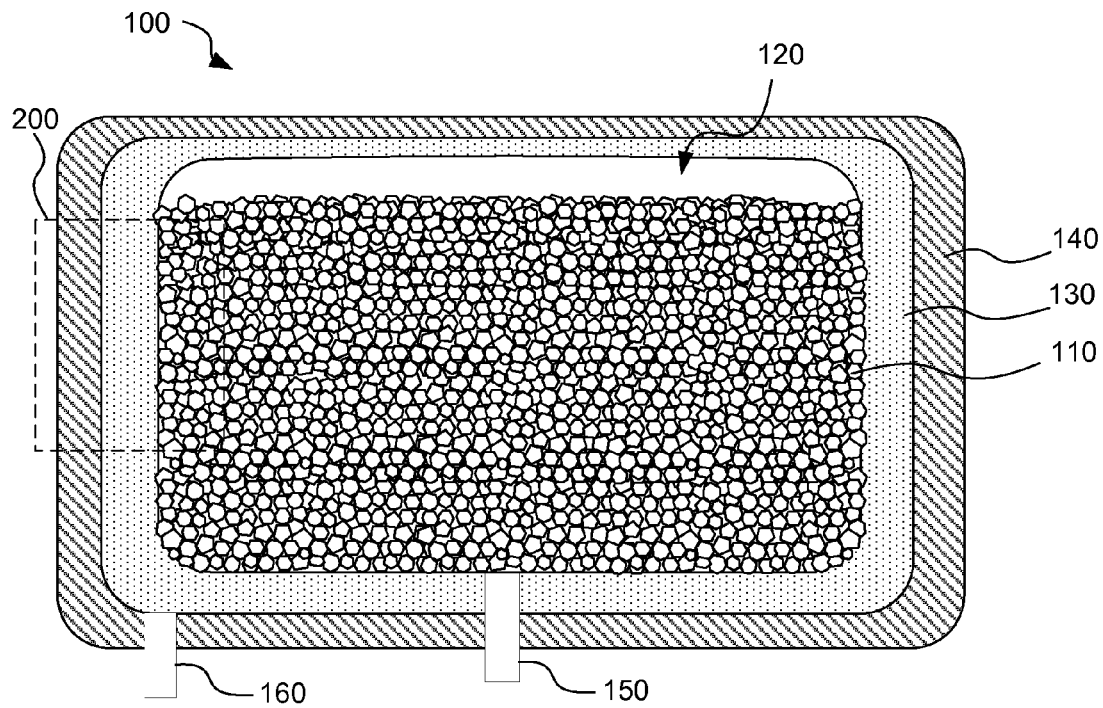
FIG. 1 is a side cutaway view of an infrastructure according to one embodiment showing an enclosed volume comprising an insulative particulate earthen layer covered by an impermeable layer and containing comminuted hydrocarbonaceous material and further showing liquid drains at the bottom or floor of the enclosed volume and further showing a liquid drain at the bottom of the insulative particulate earthen layer for the collection of condensed vapors from within the layer.

Dimensions, materials and configurations are presented in the figures merely for convenience in describing the invention and may not represent accurate relative proportions or alternative variations which are considered part of the invention. Some aspects may be exaggerated or vary from practicing embodiments in order to facilitate clarity.

DETAILED DESCRIPTION

Reference will now be made to exemplary embodiments and specific language will be used herein to describe the same. It will nevertheless be understood that no limitation of the scope of the invention is thereby intended. Alterations and further modifications of the inventive features described herein, and additional applications of the principles of the invention as described herein, which would occur to one skilled in the relevant art and having possession of this disclosure, are to be considered within the scope of the invention. Further, before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

Definitions

In describing and claiming the present invention, the following terminology will be used.

The singular forms "a," "an," and "the" include plural references unless the context clearly dictates otherwise. Thus, for example, reference to "an inlet" includes reference to one or more of such structures, "a particulate" includes reference to one or more of such materials, and "a passing step" refers to one or more of such steps.

As used herein, "conduits", "pipes", "vents" or similar terminology refers to any passageway along a specified distance which can be used to transport materials and/or heat from one point to another point. Although conduits can generally be circular pipes, other non-circular conduits can also be useful, e.g. rectangular channel, etc. Conduits can advantageously be used to either introduce fluids into or extract fluids from the material in the enclosed space, convey heat through transfer of fluids, and/or to transport radio frequency devices, fuel cell mechanisms, resistance heaters, or other devices.

As used herein, "comminuted" refers to breaking a formation or larger mass into pieces. A comminuted mass can be rubbilized or otherwise broken into fragments.

As used herein, "hydrocarbonaceous material", "hydrocarbon containing material" and the like refers to any hydrocarbon-containing material from which hydrocarbon products can be extracted or derived. For example, hydrocarbons may be extracted directly as a liquid, removed via solvent extraction, directly vaporized or otherwise removed from the material. However, many hydrocarbonaceous materials contain kerogen, bitumen or various grades of coal which are converted to a smaller molecular weight hydrocarbon liquid or gas through heating and pyrolysis. Hydrocarbonaceous material can include, but is not limited to, oil shale, tar sands, coal, lignite, bitumen, peat, and other organic materials.

As used herein, "insulative permeable particulate earthen layer," "layer," or "layers" refer to a constructed continuous layer having insulative properties such that a temperature gradient can be maintained across the layer. Insulative layers are typically vertical but can be oriented in any functional manner. Ceilings, floors and other contours and portions of the infrastructure defining the encapsulated volume can also be "layers" as used herein unless otherwise specified. Any particulate inorganic or earthen materials such as gravel, crushed rock, sand or similar materials typically having a particle size of less than about two inches in diameter may be used in forming such layer or layers.

As used herein "outer impermeable layer," "bentonite amended soil," "BAS" and the like refers to a seal control layer partially or fully encompassing the insulative particulate earthen layer or layers. The impermeable layer may cover the insulative layers, and some or all of the roof and floor of the insulative infrastructure. When used, a BAS layer typically comprises, by weight, about 6-12% bentonite clay; 15-20% water mixed with soil or aggregate often with a particle sizes less than 1" and distributed downward to the finest material readily available, although variations can be made from these general guidelines as long as the hydrated BAS can maintain a functional seal. When hydrated, the bentonite component swells to several times the dry volume of the bentonite clay thus sealing the soil such that this material is plastic and malleable. Other impermeable materials such as cement, grout, polymer (e.g. membranes, films, etc.), high temperature asphalt, sheet steel, sheet aluminum, and the like may also be used.

As used herein, "substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context. Similarly, "substantially free of" or the like refers to the lack of an identified element or agent in a composition. Particularly, elements that are identified as being "substantially free of" are either completely absent from the composition, or are included only in amounts which are small enough so as to have no measurable effect on the results of the composition.

As used herein, "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussion below regarding ranges and numerical data.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a range of about 1 to about 200 should be interpreted to include not only the explicitly recited limits of 1 and about 200, but also to include individual sizes such as 2, 3, 4, and sub-ranges such as 10 to 50, 20 to 100, etc.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Condensation System Using Insulative Permeable Layers

A system is disclosed comprising an enclosed space surrounded by an insulative permeable layer. When material within the enclosed space is heated, the layer can have a temperature gradient having a higher temperature at an inner layer surface and a lower temperature at an outer layer surface. The system may have at least one fluid outlet in the lower portion thereof for drainage of liquids, i.e. extracted or condensed hydrocarbons, and may have multiple fluid outlets and inlets depending upon how the system is utilized in the removal of hydrocarbons or other materials. However, the insulative layers forming the structure are also permeable to vapors formed from heating a material within the enclosed space. The vapors within the enclosed space are substantially at the existing high temperature at which the material is heated, although internal temperatures can vary locally within the enclosed space due to fluid flows and convective currents. The formation of vapors also results in a positive partial pressure of the vapor within the enclosed space. At this temperature and partial pressure the vapors pass outwardly through the insulative permeable layer where the vapors come into contact with matter forming the layer. The contact with the matter and the decreasing temperature across the insulative layer from the inner surface to the outer surface cause at least a portion of the vapors to condense. The condensed liquids pass downwardly through the insulative layer for collection. Additionally, the condensation of the vapors results in a local volume reduction and subsequent lessening of the pressure within the insulative layer with the resultant effect of drawing additional vapors from within the enclosed space into the layer. Further, it is noted that only a positive partial pressure of the vapors is needed to drive diffusion into the permeable layer (e.g. the total pressure difference can be zero and still have vapor diffusion as a result of concentration gradients). The positive partial pressure within the enclosed space and the decreasing of pressure within the insulative permeable layers serves as an auto condensing pump to continuously withdraw vapors from within the enclosed space into the insulative permeable particulate layer with a continuing condensation and collection of vapors.

As noted in the copending application cited above, a method of recovering hydrocarbons from hydro carbonaceous materials can include forming a constructed permeability control infrastructure. This constructed infrastructure defines a substantially enclosed or encapsulated volume. A mined or harvested hydrocarbonaceous material, which is solid or at least does not flow freely under introduction conditions, can be introduced into the enclosed infrastructure to form a permeable body of hydrocarbonaceous material. The permeable body can be heated sufficient to remove hydrocarbons therefrom. During heating, the hydrocarbonaceous material is substantially stationary as the constructed infrastructure is a fixed structure. However, as hydrocarbons are removed the residual material tends to subside and settle. In some cases, the degree of settling can be significant, although the residual material is not actively mixed. Removed hydrocarbons (including liquids and gases) can be collected for further processing, use in the process, and/or use as recovered. Suitable processing steps are adequately disclosed in the prior application incorporated herein and can be readily adapted for use in the containment infrastructure comprising insulative permeable particulate earthen layer as disclosed herein.

The insulative permeable layer can be made up of a material which is both insulating and permeable to vapors from the enclosed space. Non-limiting examples of suitable insulating and permeable materials can include particulate earthen material, open cell foam, fibrous mat, and the like. In one aspect, the insulative permeable layer can be a particulate material of less than about 2" in diameter. Although other materials may be suitable, the insulating particulate layer can typically be made up of gravel, sand, crushed lean oil shale or other insulative particulate fines which do not trap or otherwise inhibit fluid flow through the insulative particulate layer. By choosing appropriate particulate materials the layer thickness can act as the principal source of insulation. The inner surface of the insulative layer adjacent to the material being heated within the enclosed space is at the temperature of the heating process. The outer surface of the insulative layer may be at ambient temperature or other lower temperature than the inner surface. The outer surface is typically below the boiling point of water and most often well below the boiling point of the vapor. The magnitude of the gradient can vary substantially depending on the internal temperature of the enclosed space compared to the boiling point of the respective vapor of interest. It is noted that some vapors may not condense, especially in cases where the incoming vapor has multiple components. Regardless, the temperature gradient is present sufficient to condense the vapor portions desired. The temperature gradient can be tailored based on a number of variables such as, but not limited to, inner and outer surface temperatures, particle sizes within the layer, material type, layer thickness, void space, and the like.

As such, there is a substantial thermal gradient across the insulative layer width from the inner surface towards the outer surface thereof. Vapors produced during the heating process within the enclosed space penetrate this permeable insulative layer. As these vapors cool sufficiently in the insulative layer (below the condensation point of the corresponding vapors), liquids will be formed. When the material in the enclosed space is a hydrocarbonaceous material, these liquids are largely hydrocarbons. Generally, it can be advantageous that the liquids do not substantially wet the insulative layer materials, and trickle down through the layer to the bottom of the insulative layer of the enclosed space infrastructure, where they are collected and removed. Advantageously, as liquids pass down through the insulative layer, any fines present in the liquids can be filtered and removed. For example, particulate earthen materials tend to attract fines in condensed liquids. This affect can be particularly effective when liquid flow across the particulates is kept so as to maintain a thin film across substantial portions of the earthen materials. The thin film allows fines to migrate across the film thickness towards the particulate material surface where the fines can be retained (e.g. by adsorption). Additional details of this fines separation aspect can be found in U.S. Provisional Application 61/266,423 filed Dec. 3, 2009 and which is incorporated herein by reference.

The enclosed infrastructure is particularly adapted for the processing and removal of hydrocarbons from sources such as oil shale, tar sands, coal, bitumen, lignite, peat, and combinations thereof. However, the condensation mechanism can also be suitable for any other material from which condensable vapors are extracted. Non-limiting examples of additional materials can include biomass, sewage, waste sludge, and the like.

Depending upon the particular application and material being heated, the width of the insulative layer can vary from about 10 cm to 7 m, although other thicknesses can be considered for particular applications. Also, the temperature within the enclosed space can vary from about 150° C. to about 500° C., although temperatures outside this range may be suitable depending on the materials and vapors involved. As such, pressures within the enclosed space will generally vary between about 0.1 and 15 psig. The enclosed volume can range relatively broadly from several cubic meters to several hundred thousand cubic meters. The only limitation as to size of infrastructure, volume of enclosed space, width of layers, temperatures, pressures and the like being that which is functional. Upon reading this disclosure such parameters can be determined by one skilled in the art.

An outer impermeable layer can optionally encompass the insulative permeable layer. This layer is impermeable to both hydrocarbons and aqueous liquids or vapors. Typically, this layer can comprise a bentonite amended soil layer or similar material. This layer is hydrated such that the plasticity of the bentonite amended soil layer seals the infrastructure to prevent the leakage or passage of hydrocarbons outside the infrastructure except via designated conduits, condensation in the insulative layer or other suitable means. The bentonite amended soil layer also functions to prevent the passage of hydrocarbon vapors, hydrocarbon liquids and external water vapors outside of the lined infrastructure. Further, the bentonite amended soil layer is sufficiently plastic to be compressed thereby aiding in retaining the enclosed space in a sealed state. Because the bentonite amended soil layer is hydrated, the temperature at the outer surface of the insulative layer can be below the boiling point of water and is most often lower in order to retain the plasticity of the layer. Other materials can also be used for the impermeable layer including, but not limited to, polymer membranes/films, concrete, grout, asphalt, sheet metal, sheet aluminum, and the like.

Vapors can be produced in situ from solid materials within the enclosed space or may be produced from fluids introduced into the enclosed space. For example, liquids produced from a first operation can be introduced into the enclosed space and heated sufficient to produce vapors. Optionally, portions of the enclosed space can be impermeable so as to allow for retention of liquids in the enclosed space (e.g. lower portions acting as a retention basin). Furthermore, optional liquid collection trays can be introduced into the enclosed space to selectively collect and withdraw liquids from the infrastructure. In one aspect, one or more collection trays can be oriented to collect liquids which drain from the roof cap (i.e. in order to reduce the volume of such liquid which falls back into the enclosed space).

The infrastructure comprising an enclosed space surrounded by an insulative permeable layer having a temperature gradient therein can be formed using any suitable approach. However, in one currently desirable approach, the structure is formed from the floor up. The formation of a particulate earthen layer or layers and the placement in the enclosed space with a comminuted earthen hydrocarbon containing materials can be accomplished simultaneously in a vertical deposition process where materials are deposited in a predetermined pattern. For example, multiple chutes or other particulate delivery mechanisms can be oriented along corresponding locations above the deposited material. By selectively controlling the volume of particulate delivered and the location along the aerial view of the system where each respective particulate material is delivered, the insulative layer forming the structure can be formed simultaneously from the floor to the crown. The sidewall portions of the infrastructure can be formed as a continuous upward extension at the outer perimeter of the floor. If an impermeable outside layer such as amended bentonite amended soil (BAS) is present, this layer along with the particulate earthen layer are constructed as a continuous extension of the floor.

During the building up of such sidewall, a comminuted hydrocarbonaceous material can be simultaneously placed on the floor and within the sidewall perimeter such that, what will become the enclosed space, is being filled simultaneously with the rising of the constructed sidewall. In this manner, retaining walls or other lateral restraining considerations can be avoided. This approach can also be monitored during vertical build-up in order to verify that intermixing at interfaces of layers is within acceptable predetermined tolerances (e.g. maintain functionality of the respective layer). For example, excessive intermingling of BAS layer with the particulate earthen layer may compromise the sealing function of the BAS. This can be avoided by careful deposition of each adjacent layer as it is built up and/or by increasing deposited layer thickness. As the build-up process nears the upper portions, a top can be formed using the same particulate delivery mechanisms and merely adjusting the location and rate of the appropriate particulate material. For example, when the desired height of the sidewall is reached, sufficient amount of the comminuted hydro carbonaceous material can be added upon which the upper surface of the infrastructure can be deposited. In this approach, the roof portion would be supported by the hydrocarbonaceous material and does not have independent support.

Depending on the particular installation, heating pipes, collection pipes, collection trays, and/or other structures can be optionally embedded into the deposited particulate materials. An infrastructure comprising an enclosed space containing comminuted hydrocarbonaceous material is thus formed.

With the above description in mind, FIG. 1 depicts a side view of one embodiment showing a containment infrastructure 100 particularly suited for the extraction of hydrocarbons from comminuted hydrocarbon containing materials 110. The infrastructure 100 comprises an enclosed space 120 defined by an insulative permeable layer 130. Insulative layer 130 is covered by an impermeable layer 140 which, for illustration, is a bentonite amended soil. Heating means, not shown, heat the hydrocarbon containing materials 110 to a temperature sufficient to extract hydrocarbons therefrom. Typically, this temperature will be between about 150° C. to about 500° C. As hydrocarbons are released as a result of the heating or roasting process, liquids and/or vapors will form. Liquids will drain from the infrastructure via floor drain 150. Vapors formed within the enclosed space will result in a positive pressure of between about 0.1 to about 15 psig. If desired, conduits (not shown) can be placed in the enclosed space 120 to withdraw vapors such as indicated in copending U.S. application Ser. No. 12/028,569, filed Feb. 8, 2008 which is incorporated herein in its entirety by reference. However, even if conduits or other vapor collection means are present, not all vapors are collected external to the enclosed space. Regardless of the presence of vapor collection means there remains a need to collect and recover maximum amounts of vapors produced during the heating or roasting process.

Figure 2:
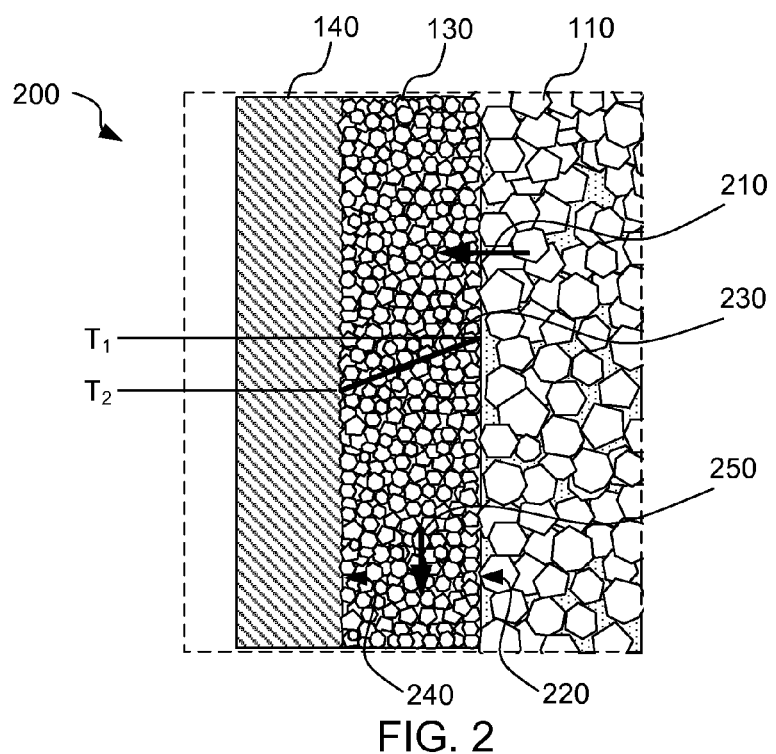
FIG. 2 is an exploded view of a portion of the infrastructure of FIG. 1 as defined by dotted lines showing in greater detail the comminuted hydro carbonaceous material within the enclosed space, the insulative particulate earthen layer showing particulate earthen materials and having an inner surface and an outer surface exhibiting a temperature gradient thereacross, an outer impermeable layer and showing directional arrows indicating the passage of vapors into the layer from the enclosed volume and downward flow of condensed liquids in the insulative layer.

The positive pressure present in the enclosed space during the heating process in combination with the permeability of the insulative layer 130 facilitates the passage of vapors at the temperature of the heating process into the layer 130 where they at least partially condense such that liquids drain down through the inner volume of the layer where they are collected via a secondary drain 160. More specifically, as shown in FIG. 2, the vapors 210 enter the layer via inner surface 220. Once within the particulate layer the vapors come in contact with the particulate material 130. There is a decreasing temperature gradient 230 (i.e. from $T_1$ to $T_2$ where $T_1 > T_2$) between the inner surface of the insulative layer 130 and the outer surface 240 of the layer. The temperature at the outer surface 240 is significantly lower than at the inner surface 220. Vapors 210 in contact with and passing through the temperature gradient 230 of particulate earthen material condense due to the lowering of the temperature and pass downwardly as indicated by directional arrow 250 for collection. Notably, the temperature gradient can be linear at equilibrium, although varied profiles can occur during transient non-equilibrium conditions resulting from changes in the outer surface and/or inner surface temperatures. Vapor condensation also results in the lessening of pressure within the layer 130 which results in additional vapors 210 permeating the inner layer surface 200. In such functionality the system serves as an auto condensing pump to urge vapors from within the enclosed space into the insulative particulate earthen layer for condensation and recovery.

It is to be understood that the above-referenced arrangements are illustrative of the application for the principles of the present invention. Thus, while the present invention has been described above in connection with the exemplary embodiments of the invention, it will be apparent to those of ordinary skill in the art that numerous modifications and alternative arrangements can be made without departing from the principles and concepts of the invention as set forth in the claims.

What is claimed is:

1. A method for removal and condensation of vapors from within an enclosed space comprising:

heating a hydrocarbonaceous material within an enclosed space to form hydrocarbon vapors extracted therefrom, wherein the hydrocarbonaceous material is selected from the group consisting of oil shale, tar sands, coal, bitumen, lignite, peat, and combinations thereof, said enclosed space being surrounded by an insulative permeable layer having a temperature gradient therein, wherein the insulative permeable layer is distinct from the hydrocarbonaceous material in at least one of average particle size and composition, wherein an inner layer surface defining said enclosed space is at a first higher temperature and has a decreasingly lower temperature across a width of said insulative layer to an outer surface thereof, wherein said vapors are at said first higher temperature and are also at a first positive pressure within the enclosed space;

passing said vapors through the inner surface of said insulative layer where such vapors contact matter forming said insulative layer and pass outwardly toward the outer surface of said insulative layer where contact of the vapors with the matter and the decreasing temperature of the gradient across said insulative layer causes the vapors to condense with a resultant lessening of pressure within the insulative layer thereby causing additional vapors to be drawn from the enclosed space into said insulative layer for condensation and wherein said condensate liquid passes downwardly through the matter of the insulative layer for collection.

2. The method of claim 1, wherein the insulative layer is formed of particulates.

3. The method of claim 2, wherein the particulates are a particulate earthen material which includes at least one of gravel, crushed rock, sand, crushed oil shale, soil, and combinations thereof.

4. The method of claim 2, wherein the particulates forming said earthen layer have an average size of less than two inches in diameter.

5. The method of claim 1, wherein the insulative layer is formed of an open cell foam or fibrous mat.

6. The method of claim 1, wherein said insulative layer has a width from about 10 cm to about 7 m.

7. The method of claim 1, wherein the first higher temperature from about 150° C. to about 500° C.

8. The method of claim 1, wherein the first and positive pressure of said vapors within said enclosed space is from about 0.1 psig to 15 psig.

9. The method of claim 1, wherein the outer surface has a temperature from about 0° C. to about 80° C.

10. The method of claim 1, further comprising collecting the condensate liquid.

11. The method of claim 1, further comprising forming an outer impermeable layer encompassing the insulative permeable layer.

12. The method of claim 1, wherein the insulative permeable layer is substantially stationary.

* * * * *